Jan. 10, 1933.　　　A. ERIKSSON　　　1,893,936
POWER MEANS FOR AIRCRAFT
Filed June 12, 1931
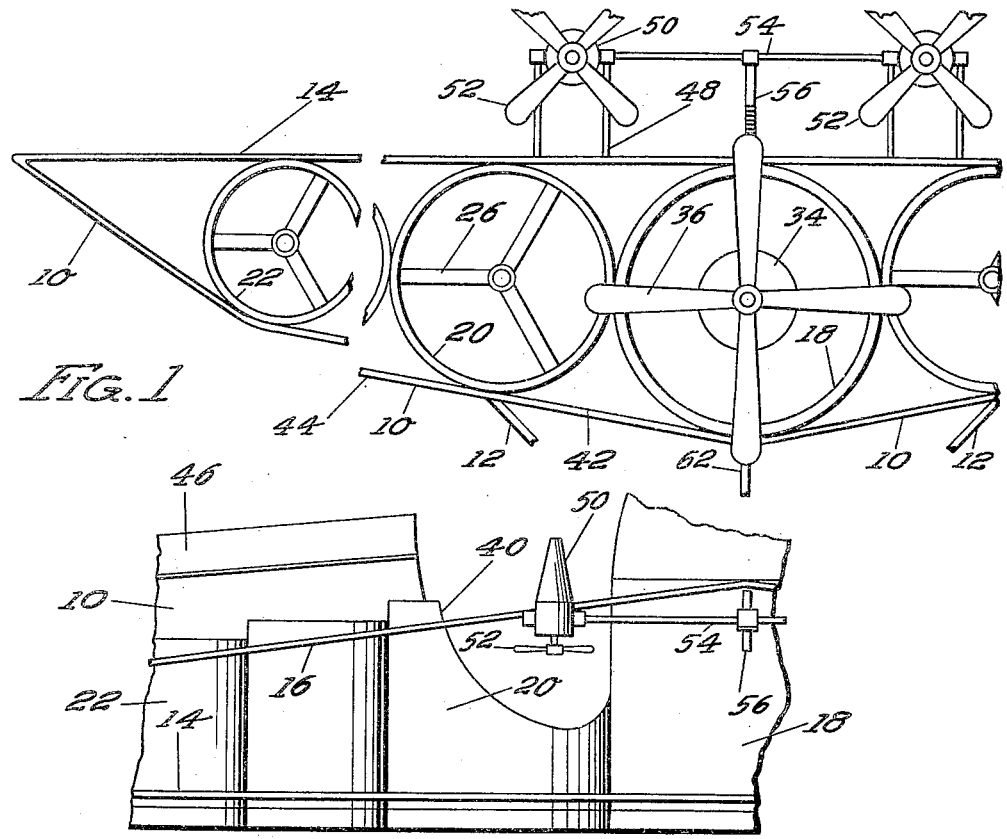
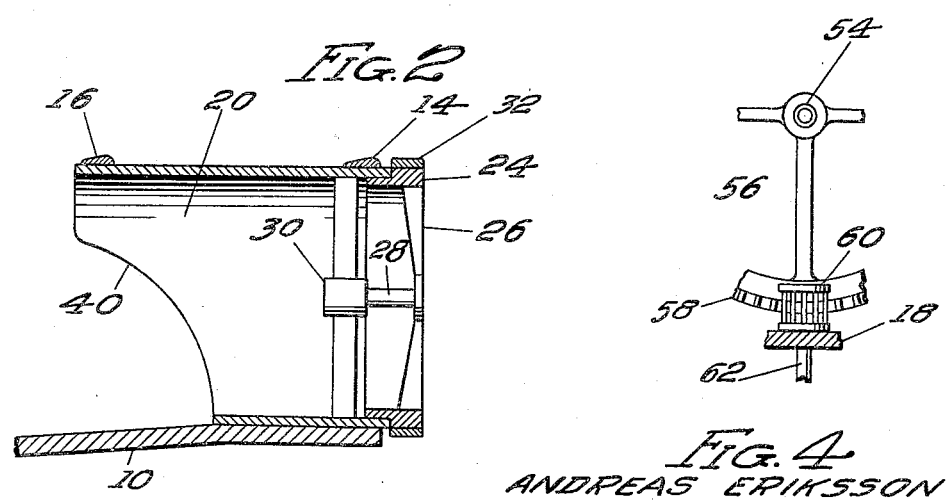
ANDREAS ERIKSSON
INVENTOR
PER
ATTORNEY Patented Jan. 10, 1933

1,893,936

UNITED STATES PATENT OFFICE

ANDREAS ERIKSSON, OF CHICAGO, ILLINOIS

POWER MEANS FOR AIRCRAFT

Application filed June 12, 1931. Serial No. 543,303.

This invention relates to an improved power means for aircraft, particularly those of the type known as heavier than air devices wherein the propelling and lifting forces are accomplished by energy derived from a motor which drives the propeller or series of propellers in the air.

One of the important objects of this invention is to provide a power means for aircraft, whereby the power, particularly that used for propellant purposes, is distributed over practically the entire available forward surface of the airplane or other device with the result that a more uniform drive and more satisfactory operation results.

Another and further important object of the invention resides in the provision of a modified means of propellant for aircraft and the like whereby a series of propellers operating in wind tunnels is distributed over either all or a major portion of the body of the craft, and wherein full advantage is taken of the streamline and venturi effect of columns of air in motion.

Another and still further important object of the invention resides in the provision of auxiliary motors in connection with an aircraft which motors can be tilted so as to enable their driving force to be exerted at angles to the horizontal.

Other and further important objects of the invention will be apparent from the disclosures in the accompanying drawing and following specification.

The invention, in a preferred form, is illustrated in the drawing and hereinafter more fully described.

In the drawing:

Figure 1 is a front elevation of a portion of an aircraft equipped with the novel power means of this invention.

Figure 2 is a top plan view of a portion of the device shown in Figure 1.

Figure 3 is a detail view, partly in section, of one of the combined wind tunnel and propeller elements used as a portion of the power means.

Figure 4 is a detail view, parts being broken away, of a means for controlling the angle of operation of the auxiliary motors.

As shown in the drawing:

The reference numeral 10 indicates generally the wing surface of the aircraft of this invention, the same having depending struts or the like 12 to which is attached a fuselage or some other form of body which body will include either landing gear or pontoons as desired. The shape of the wing is curving downwardly as best illustrated in Figure 1, this shape giving a streamline effect, thereby decreasing air resistance, while at the same time maintaining an effective lifting surface.

Mounted upon the wing 10 and held in position thereon by a series of horizontal struts 14 and 16 is a series of tubular elements 18, 20, 22, etc.

Each of these tubular elements is fixed in position, but in the forward end of each is rotatably mounted a sleeve 24 as best illustrated in Figure 3, this sleeve having interiorly mounted propeller blades or the like 26, these being on a central shaft 28 which shaft itself is mounted in a rotor or other suitable bearing element 30.

Around the periphery of the forward edge of each of the elements 24 is a friction band or the like 32 which can be composed of rubber or similar material, and which closely contacts with a similar band on the adjacent cylinder or wind tunnel.

The forward edge of the central wind tunnel 18 is positively rotated by means of a motor or the like 34 which drives propeller blades 36, thereby forcing a stream of air through the cylinder or tunnel, and it will be obvious that rotation of the forward edge of the cylinder 18 will, on account of its close contact with the forward edges of the adjacent cylinders cause them to rotate, and they in turn will rotate those adjacent with the result that all of the propeller blades in the respective cylinders or tunnels will be in motion. The angle of inclination of the blades themselves will be alternately reversed so that air will be forced through the tunnels or cylinders, all in one direction.

As best shown in Figures 2 and 3, the inner edges of certain of the cylinders or tunnels are cut away as at 40, this producing a further streamline effect and less air resistance, while at the same time an aspirating or suction effect is created in the space between the cylinders and the wing 10, such as the space indicated by the reference numerals 42 and 44 in Figure 1. In this way, an additional efficiency is obtained. The wing 10 is provided at its rear with fins or rudder elements 46, and mounted above the entire structure which comprises the wing and its associated tunnels is a framework or the like 48 whereon is supported a pair of auxiliary motors such as illustrated at 50 and which drive propeller blades or the like 52. At 40 is also a cutaway in wing 10 to produce the right effect of propeller 52.

These motors are tiltably mounted on a common supporting shaft 54, the said shaft having affixed thereto at its central portion a semi-circular rack or the like 56, the periphery of the rack being provided with gear teeth 58 which are in mesh with an operating gear cage 60 as best shown in Figure 4, this, in turn, being controlled by the rotation of a shaft 62 upon which the gear cage is mounted, and which shaft 62 extends downwardly to the gondola or fuselage of the aircraft. Obviously, a suitable rotation of the shaft 62 will cause a corresponding tilting of the motors 50, and their associated propeller blades 52, whereby the effective angle of operation of the propeller blades can be varied from the horizontal to effect a climbing or diving action as desired or necessary. This action can, of course, be associated with the fins or rudders 46 either manually or automatically as desired.

It will be evident that herein is provided a novel and useful power means for aircraft whereby the effective pull or push of the propeller blades is distributed over a very considerable area, while at the same time only a very small additional amount of power is required, thereby resulting in increased efficiency. Additionally, the wind tunnel action associated with the respective propellers provides for a better distribution of effective power in the air throughout, and the aspirating effect of the moving current of air is likewise used to full advantage.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A power means for aircraft, comprising a central motor, and a plurality of sets of propeller blades operatively associated therewith, and a wind tunnel structure associated with each of said sets of propeller blades, and a revolvable forward edge for each of said wind tunnel structures, certain of the sets of propeller blades mounted in said forward edge.

2. A power means for aircraft, comprising a central motor, and a plurality of sets of propeller blades operatively associated therewith, and a wind tunnel structure associated with each of said sets of propeller blades, and a revolvable forward edge for each of said wind tunnel structures, and drive connections between said revolvable forward edges.

3. A power means for aircraft, comprising a central motor, and a plurality of sets of propeller blades operatively associated therewith, and a wind tunnel structure associated with each of said sets of propeller blades, and a revolvable forward edge for each of said wind tunnel structures, and frictional drive connections between said revolvable forward edges.

4. A power means for aircraft, comprising a central motor, and a plurality of sets of propeller blades operatively associated therewith, and a wind tunnel structure associated with each of said sets of propeller blades, together with auxiliary motors independent of the first-named motor, and means for shifting the effective angle of operation of said auxiliary motors, said means comprising a common shaft upon which said motors are mounted, and means for rotating said shaft, said means comprising a rack mounted on the shaft, and a gear, and a shaft associated with the rack for moving the same, and means for creating an air stream-line, said means comprising cut-aways in tunnels and also in wings.

5. A power means for aircraft, including a central motor, a central wind terminal associated therewith, a plurality of sets of auxiliary propeller blades, a wind tunnel associated with each auxiliary propeller blade set, and means for driving the auxiliary blades from the central motor, said means comprising rotatable frictionally contacting and driven forward edges of juxtaposed wind tunnels.

In testimony whereof I affix my signature.

ANDREAS ERIKSSON.